United States Patent
Chuang

(10) Patent No.: US 6,335,970 B1
(45) Date of Patent: Jan. 1, 2002

(54) AUTOMATIC COIN COLLECTION DEVICE FOR A PAYPHONE PROVIDED WITH NO COIN COLLECTION SIGNAL

(76) Inventor: Shou Tsai Chuang, No. 14-33, TenHu Lei, SanHsia Cheng, Taipei Hsien (TW)

( * ) Notice: Subject to any disclaimer, the term of this patent is extended or adjusted under 35 U.S.C. 154(b) by 0 days.

(21) Appl. No.: 09/460,398

(22) Filed: Dec. 13, 1999

(51) Int. Cl.⁷ .............................................. H04M 17/00
(52) U.S. Cl. ................. 379/146; 379/143; 379/144.01; 379/144.02; 379/144.06
(58) Field of Search ............................ 379/143, 144.01, 379/144.06, 146, 147, 149, 150, 155, 144.02, 144.05, 151, 153, 157, 167.01

(56) References Cited

U.S. PATENT DOCUMENTS

| | | | |
|---|---|---|---|
| 4,768,223 A | * 8/1988 | Kinshita et al. | ............ 379/143 |
| 4,768,227 A | * 8/1988 | Dively et al. | ................ 379/112 |
| 4,935,956 A | * 6/1990 | Hellwarth et al. | .......... 379/112 |
| 5,007,077 A | * 4/1991 | Fields et al. | ................. 379/143 |
| 5,150,399 A | * 9/1992 | Yasuda | ........................ 379/143 |
| 6,101,247 A | * 8/2000 | Lalin | ........................... 379/143 |

* cited by examiner

*Primary Examiner*—Curtis Kuntz
*Assistant Examiner*—Quoc D. Tran
(74) *Attorney, Agent, or Firm*—Bacon & Thomas

(57) ABSTRACT

An automatic coin collection device for a payphone provided with no coin collection signal is disclosed, which has a solenoid to be activated to collect coins so as to start to count time and begin telephone communication. A call tone detector is connected to a telephone line for detecting a call tone on the line. A voice detecting circuit is connected to the telephone line for detecting a voice signal on the line. A micro-controller is provided for analyzing the detecting results of the call tone detector and the voice detecting circuit after dialing to activate the solenoid when a ring back tone disappears and a voice signal appears, or when no ring back tone is detected but a voice signal appears. With this, the user can use a payphone to make a phone call without the need of pressing a pushbutton to collect coins.

11 Claims, 4 Drawing Sheets

AUTOMATIC COIN COLLECTION DEVICE FOR A PAYPHONE PROVIDED WITH NO COIN COLLECTION SIGNAL

BACKGROUND OF THE INVENTION

1. Field of the Invention

The present invention relates to the field of payphones and, more particularly, to an automatic coin collection device for a payphone that is provided with no coin collection signal.

2. Description of the Related Art

Conventionally, a payphone installed in a telephone booth by a telephone company has the function of automatic coin collection after a telephone connection has been established thereby, starting to charge the caller. This function is available because the telephone switch provides a so called coin collection signal, which is an inverse polarity or 12/16 KHz coin collection signal, to the payphone when establishing the telephone connection. However, for private individuals or companies desiring to install payphones on private lines in stores, restaurants, cafeterias, or amusement centers, the coin collection signals are not provided by the telephone switch. Therefore, as shown in FIG. 4, the payphone 40 installed currently should have a pushbutton 41, such that the user can press the pushbutton 41 when a telephone connection is established, thereby accomplishing the function of coin collection. Such a coinbox payphone 40 is currently in use in many countries.

The use of the aforementioned coinbox payphone would not be satisfactory because users are not aware of the operating procedure. Generally, the user may operate the pushbutton 41 incorrectly, such as press it too early, too late, or even forget to press, which results in unnecessary conflicts between the user and the payphone owner. Even worse is that some users may intentionally use the payphone to make a phone call and listen to the message from an answering machine, or may maliciously operate the payphone to make phone calls without pressing the pushbutton (41). For these reasons, sales of this type payphone are greatly limited. As such, it may cause an economic loss to the payphone owner. Therefore, there is a need for the above payphone to be improved.

SUMMARY OF THE INVENTION

It is therefore an object of the present invention to provide an automatic coin collection device for a payphone to be used on a private line which has no coin collection signal. With this, the user can use the payphone to make a phone call without the need of pressing the pushbutton.

To achieve the above objects, there is provided an automatic coin collection device, which includes: a solenoid for being activated to collect coins so as to start to count time and begin telephone communication; a call tone detector connected to a telephone line for detecting a call tone on the telephone line; a voice detecting circuit connected to the telephone line for detecting a voice signal on the telephone line; and a micro-controller for performing an analysis based on the detecting results of the call tone detector and the voice detector circuit after a user has dialed the payphone to make a phone call, and for activating the solenoid to start to count time and begin telephone communication when a ring back tone on the telephone line disappears and a voice signal appears, or when no ring back tone is detected but a voice signal appears.

The above and other objects, features, and advantages of the present invention will become apparent from the following detailed description taken with the accompanying drawings.

DETAILED DESCRIPTION OF PREFERRED EMBODIMENTS

Figure 1:
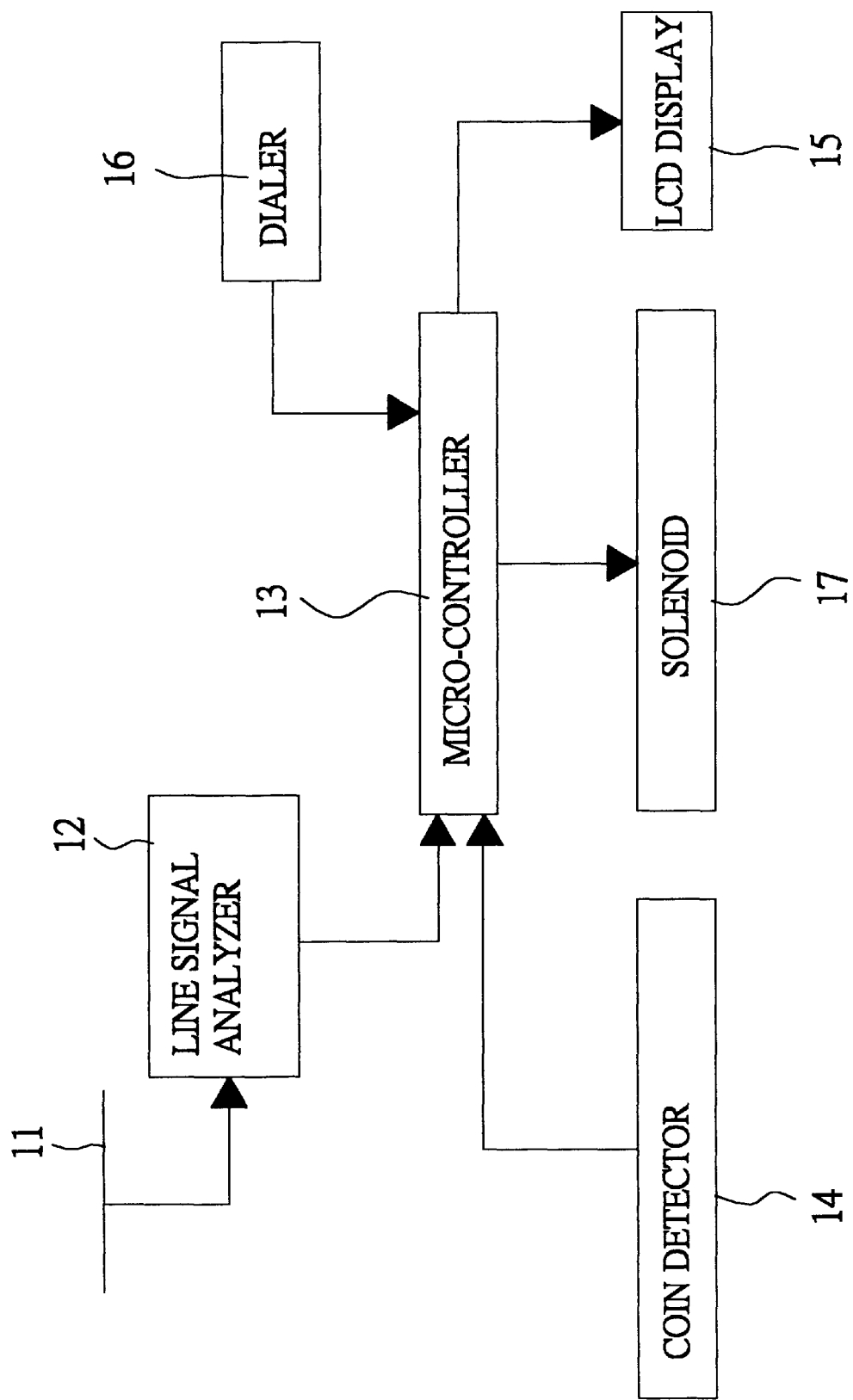
FIG. 1 is a block diagram of an automatic coin collection device in accordance with the present invention.

Referring to FIG. 1, there is shown the block diagram of an automatic coin collection device for a payphone in accordance with the present invention. The payphone is connected to an ordinary telephone line that is provided with no coin collection signal, such that it is impossible for the payphone to start to collect coins based on the coin collection signal. Therefore, a line signal analyzer 12 and a micro-controller 13 of the automatic coin collection device are provided to perform a synthesis analysis on the time domain, frequency domain and signal amplitude of the signal on the telephone line 11 for determining whether the signal is a noise, voice, or call tone, thereby further determining the status of the telephone line 11, which may be of ringing, busy, empty, or connected. Accordingly, an automatic coin collection function can be achieved.

In details, the automatic coin collection device in accordance with the present invention includes a line signal analyzer 12, a micro-controller 13, a coin detector 14, an LCD display 15, a dialer 16, and a solenoid 17. When a user inserts a coin into the payphone for making a phone call, the coin detector 14 detects the insertion of coins and activates the micro-controller 13 to monitor the dialer 16. When the micro-controller 13 detects that the dialing operation is completed, the line signal analyzer 12 detects the signal on the telephone line 11 to be applied to the micro-controller 13 to perform a synthesis analysis thereby driving the solenoid 17 to start to count time and begin telephone communication. The solenoid 17 is provided as a switch device to initiate a coin collecting operation and thus can be replaced by other electronic switches without departing from the scope of the invention.

Figure 2:
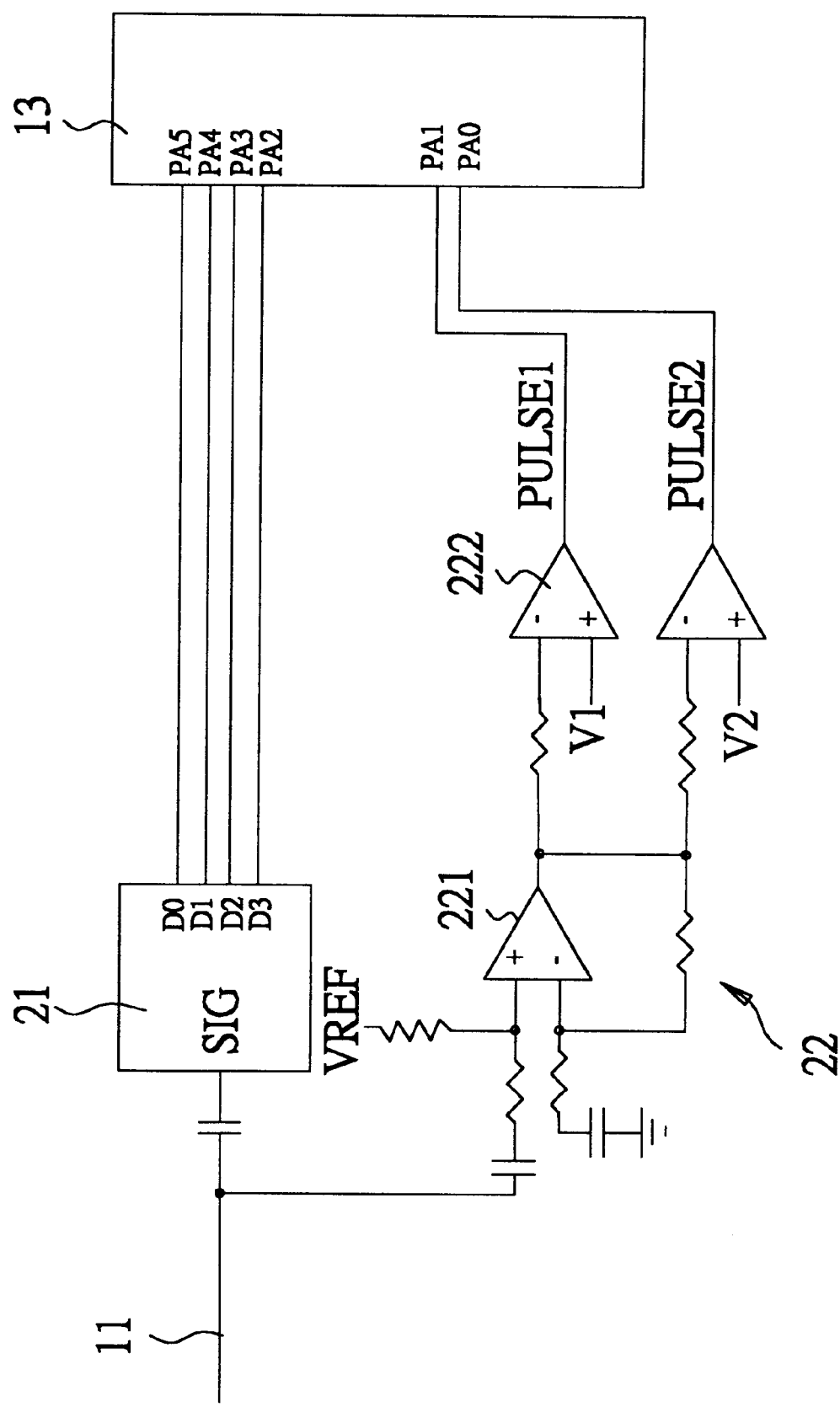
FIG. 2 is a circuit diagram of the line signal analyzer and the micro-controller shown in FIG. 1.

FIG. 2 shows the circuit structure of the line signal analyzer 12 and the micro-controller 13, wherein the micro-controller 13 is an 8-bit microprocessor chip and the line signal analyzer 12 consists of a call tone detector 21 and a voice detecting circuit 22. Preferably, the call tone detector 21 is implemented in a call tone decoder chip capable of detecting the appearance of a call tone on the telephone line 11. The call tone decoder chip has a signal input port SIG connected to the telephone line 11, and four output ports D0-D3 connected to the input ports PA5-PA2 of the micro-controller 13, thereby detecting whether there is a call tone appearing on the telephone line 11 with the detecting result being applied to the micro-controller 13 for performing an analysis. The voice detecting circuit 22 has an amplifier 221 for amplifying the signal from the telephone line 11. The amplified signal is then applied to two comparators 222 and 223 to compare with reference voltage V1 and V2, respectively, for generating two pulse signals PULSE 1 and PULSE 2, which are applied to the input ports PA1 and PA0 of the micro-controller 13, respectively, for being processed and analyzed to determine whether there is a voice signal appearing on the telephone line 11.

Accordingly, the micro-controller 13 performs a synthesis analysis based on the detecting results of the call tone detector 21 and the voice detecting circuit 22. Particularly, the micro-controller 13 determines whether there is a ring back tone, busy tone, or voice signal appearing on the telephone line 11 by analyzing the duration of the call tone, thereby activating the solenoid 17 to start to count time and begin telephone communication.

Figure 3:
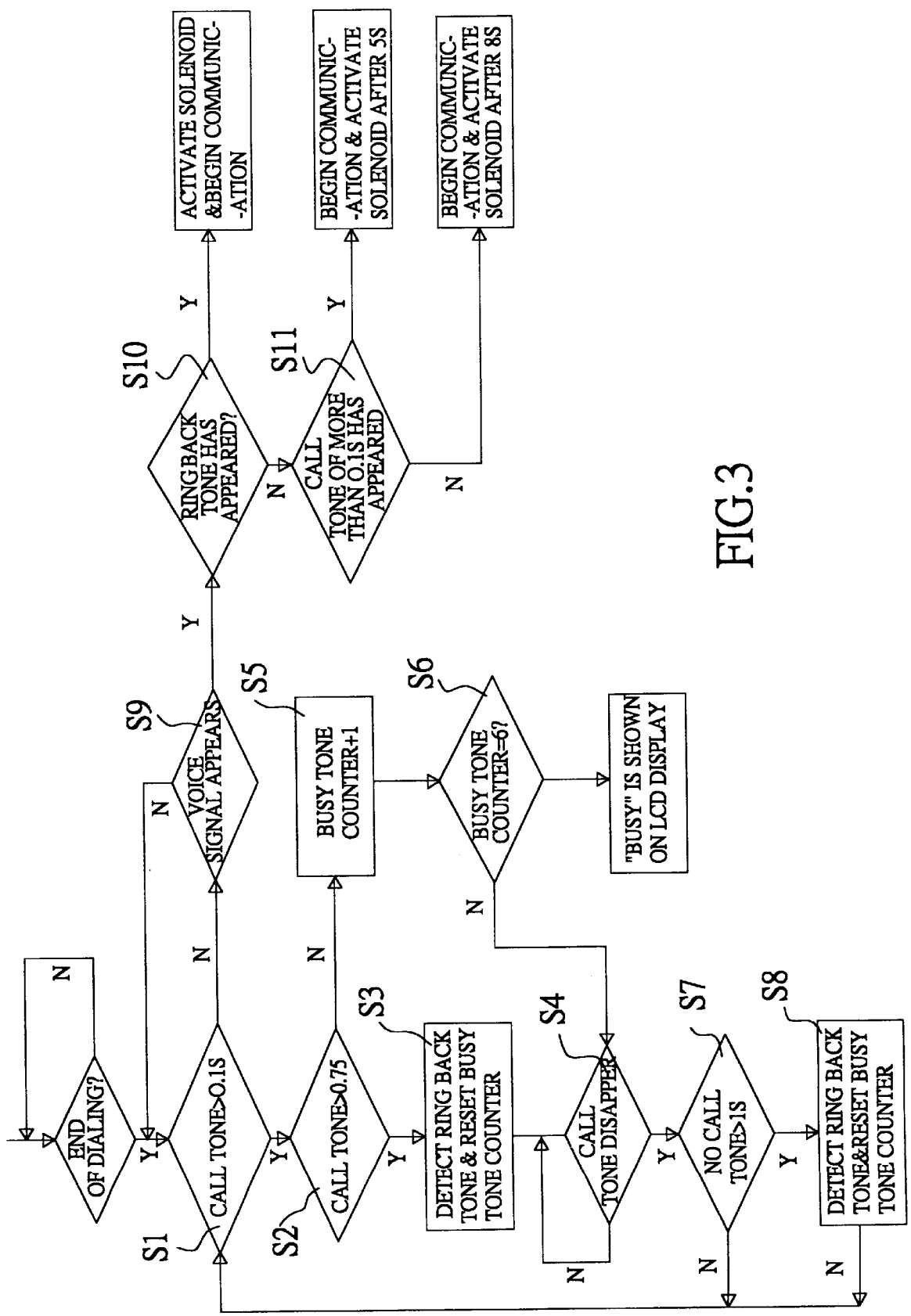
FIG. 3 is a control flowchart illustrating the process performed in the micro-controller shown in FIG. 1.
Figure 4:
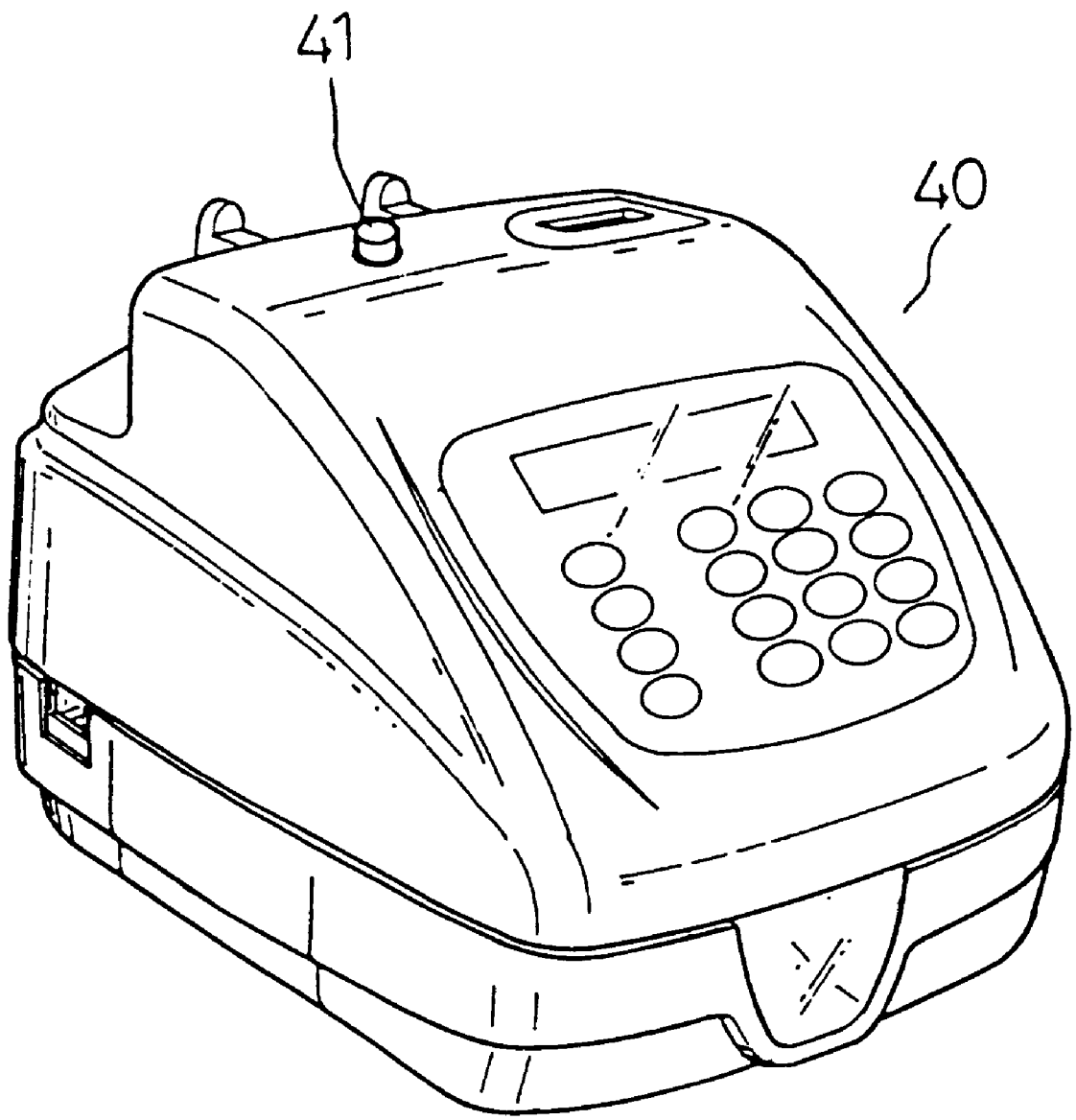
FIG. 4 is a perspective view of a conventional coinbox payphone.

FIG. 3 shows a control flowchart executed by the micro-controller 13 to perform the synthesis analysis, wherein, in step S1, the micro-controller 13 detects whether there is a call tone lasting for more than 0.1 second on the telephone line 11 after end of dialing. If yes, Step S2 is executed to determine whether the duration time of the call tone is more than 0.7 second. It is known that, generally, a ring back tone is of a tone with a period of 1–2 seconds on and 3.5–4 seconds off, and a busy tone is of a tone with a period of less than 0.5 second on and less than 0.5 second off. Therefore, if the determination result in Step S2 is yes, it is assured that the call tone appearing on the telephone line 11 is a ring back tone. Then, Step S3 is executed to reset a busy tone counter to zero. Subsequently, Step S4 is executed to wait for the call tone to disappear.

When the determination result in Step S2 is no, the call tone appearing on the telephone line 11 is a busy tone, and thus, Step S5 is executed to increase the busy tone counter by one. Then, Step S6 is executed to determine whether the busy tone counter has reached a threshold value (e.g., six). If yes, it is determined that the called party is busy and a message is shown on the LCD display 15 to notify the user of such. If not, Step S4 is executed to wait for the call tone to disappear.

When the call tone disappears, Step S7 is executed to determine whether the duration time of no call tone is more than 1 second. If yes, it is assured that there is a ring back tone appearing on the telephone line 11 and Step S8 is executed to reset the busy tone counter to zero. Subsequently, Step S1 is executed to keep monitoring the status of the telephone line 11. On the other hand, if the determination result of Step S7 is no, Step S1 is also executed to keep monitoring the status of the telephone line 11.

When the determination result in Step S1 is no, it is possible that the called party has answered the phone call or the called party is inactive (a message provided by the telephone switch can be heard). It is also possible that the detection in Step S1 is an error. Thus, the micro-controller 13 executes Step S9 to detect whether there is a voice signal appearing on the telephone line 11. If not, it indicates that there is an error in detecting the call tone and Step S1 is executed again to detect the status of the telephone line 11. If yes, Step S10 is executed to assure whether there has been a ring back tone detected on the telephone line 11. If yes, it is determined that the called party has answered the phone call and the solenoid 17 is activated to start count time and begin telephone communication. If no, it is possible that the called party has answered the phone call before a ring back tone is generated, or the called number is inactive. Therefore, Step S11 has to be executed to determine whether there has been a call tone with a duration time more than 0.1 second. If yes, it is determined that the called party has answered the phone call before a ring back tone was generated, thus starting to count time and begin telephone communication, and activating the solenoid 17 to collect coins after a delay time of 5 seconds. If no, it is determined that the called number may be an inactive number, so as to start to count time and begin telephone communication, and activate the solenoid 17 to collect coins after a delay time of 8 seconds. With the use of the delay time, the user is able to check the progress of the phone call, thereby preventing an erroneous operation.

While the invention herein disclosed has been described by means of specific embodiments, numerous modifications and variations could be made thereto by those skilled in the art without departing from the scope of the invention set forth in the claims.

What is claimed is:

1. An automatic coin collection device for a payphone that is provided with no coin collection signal from a telephone line, comprising:

a solenoid for being activated to collect coins so as to start to count time and begin telephone communication;

a call tone detector connected to the telephone line for detecting a call tone on the telephone line;

a voice detecting circuit connected to the telephone line for detecting a voice signal on the telephone line;

a micro-controller for performing an analysis based on the detecting results of the call tone detector and the voice detecting circuit after a user has dialed the payphone to make a phone call, and for activating the solenoid to start to count time and begin telephone communication when a ring back tone on the telephone line disappears and a voice signal appears, or when no ring back tone is detected but a voice signal appears;

wherein, the micro-controller determines whether there is a ring back tone or a busy tone appearing on the telephone line by analyzing a duration time of the call tone and activates the solenoid to start to count time and begin telephone communication when the detected ring back tone appearing on the telephone line has a duration time shorter than a predefined first duration time and a voice signal is detected on the telephone line or when there is a ring back tone appearing previously on the telephone line after determining that the detected ring back tone appearing on the telephone line has a duration time shorter than a predefined first duration time and a voice signal is detected in the telephone line; and after detecting that there is a voice signal appearing on the telephone line and if there has been no ring back tone appearing on the telephone line, the micro-controller performs an analysis to determine whether a call tone has appeared on the telephone line with a duration time longer than the first duration time, and if yes, starts to count time and begins telephone communication and activates the solenoid after a predefined first delay time, otherwise, starts to count time and begin telephone communication and activates the solenoid after a predefined second delay time.

2. The automatic coin collection device as claimed in claim 1, wherein the micro-controller determines that the detected call tone is a ring back tone if the call tone has a duration time longer than the first duration and also longer than a predefined second duration time.

3. The automatic coin collection device as claimed in claim 2, wherein the micro-controller determines that the detected call tone is a busy back tone if the call tone has a duration time longer than the first duration but shorter than the second duration time.

4. The automatic coin collection device as claimed in claim 3, wherein the micro-controller determines that a called party is busy when the number of appearance of the busy tone reaches a predefined threshold value.

5. The automatic coin collection device as claimed in claim 4, wherein, if the number of appearance of the busy tone does not reach the threshold value and after the call tone disappears, the micro-controller determines whether there is a duration time of no call tone longer than a predefined third duration time, and if yes, the call tone is determined to be a ring back tone.

6. The automatic coin collection device as claimed in claim 5, wherein the call tone detector is a call tone decoder chip.

7. The automatic coin collection device as claimed in claim 6, wherein the voice detector circuit comprises:

an amplifier for amplifying a signal from the telephone line; and two comparators for comparing the amplified signal with two reference voltages respectively to obtain two pulse signals for being applied to the micro-controller to determine whether there is a voice signal appearing on the telephone line.

8. The automatic coin collection device as claimed in claim 7, wherein the micro-controller is an 8-bit microprocessor chip.

9. The automatic coin collection device as claimed in claim 8, wherein the first duration time is approximately 0.1 second, the second duration time is approximately 0.7 second, and the third duration time is approximately 1 second.

10. The automatic coin collection device as claimed in claim 9, wherein the first delay is approximately 5 seconds and the second delay is approximately 8 seconds.

11. The automatic coin collection device as claimed in claim 10, wherein the threshold value is 6.

* * * * *